US006993340B1

(12) United States Patent
Rinne et al.

(10) Patent No.: US 6,993,340 B1
(45) Date of Patent: Jan. 31, 2006

(54) INFORMATION TRANSMISSION IN A TELECOMMUNICATIONS SYSTEM

(75) Inventors: Mikko J. Rinne, Helsinki (FI); Kalle Ahmavaara, Helsinki (FI); Terhi Virtanen, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/504,996

(22) Filed: Feb. 15, 2000

Related U.S. Application Data

(63) Continuation of application No. PCT/FI98/00633, filed on Aug. 18, 1998.

(30) Foreign Application Priority Data

Aug. 19, 1997 (FI) ...................................... 973394

(51) Int. Cl.
    *H04Q 7/20*     (2006.01)
    *H04B 1/38*     (2006.01)
    *H04B 7/212*     (2006.01)
    *H04J 3/00*     (2006.01)

(52) U.S. Cl. .................. 455/450; 455/434; 455/452.1; 455/456.5; 455/456.6; 455/560; 370/337; 370/347

(58) Field of Classification Search ................. 455/62, 455/450, 452, 434, 515–517, 422.1, 424–425, 455/452.1, 453, 455, 456.5, 456.6, 560–561; 370/337, 347, 465, 468
See application file for complete search history.

(56) References Cited

U.S. PATENT DOCUMENTS 5,404,355 A * 4/1995 Raith .......................... 370/95.1

5,590,133 A * 12/1996 Billstrom et al. ............ 370/349
5,896,376 A * 4/1999 Alperovich et al. ......... 370/348
5,926,469 A * 7/1999 Norstedt et al. ............. 370/329

FOREIGN PATENT DOCUMENTS

EP      0 534 612      3/1993

(Continued)

OTHER PUBLICATIONS

IBM Technical Disclosure Bulletin, Aug. 1993, US; vol. 36, Issue No. 8, pp. 315-316.*

*Primary Examiner*—William Trost
*Assistant Examiner*—Meless Zewdu
(74) *Attorney, Agent, or Firm*—Squire, Sanders and Dempsey, L.L.P.

(57) ABSTRACT

The idea of the present invention is to enable the transmission of control information via several logical channels and to select the transmission channel dynamically by using a predefined selection rule. There are at least two logical channels that can be selected for the transmission of information. These logical channels should preferably include at least one signalling channel which is allocated in a connection-specific manner. The signalling channels which are allocated in a connection-specific manner can be signalling channels which use the capacity of the traffic channel of independent singalling channels which are allocated separately from traffic channels. At least one of the logical channels available for selection should preferably also be a shared channel allocated to several connections for joint signalling. The parameters of the selection rule used in the logical channel selection can include, for example, the effect of the use of the logical channels on the quality of service of the connection which uses the traffic channel, the current usage rate of the logical channels, the number and priority of messages to be sent, and an estimate of the number and priority of messages to be sent in the near future.

24 Claims, 5 Drawing Sheets

FOREIGN PATENT DOCUMENTS

| | | | |
|---|---|---|---|
| JP | 08 016 505 A | * | 1/1996 |
| JP | 61 062 958 A | * | 3/1996 |
| JP | 08 191 306 A | * | 7/1996 |
| WO | 95/19687 | | 7/1995 |
| WO | 96/07284 | | 3/1996 |
| WO | 96/22665 | | 7/1996 |

* cited by examiner

INFORMATION TRANSMISSION IN A TELECOMMUNICATIONS SYSTEM

This application is a continuation of international application serial number PCT/FI98/00633, filed 18 Aug. 1998.

FIELD OF THE INVENTION

The invention is related to the transmission of information, specifically control information, in a telecommunications system. In particular, the system is related to the transmission of information in a telecommunications system which consists of several subscriber units and at least one network element servicing the subscriber units.

BACKGROUND OF THE INVENTION

In addition to actual information, telecommunications systems must transmit control information to guarantee successful flow of information between the sender and the receiver. The required control information includes, for example, channel addressing, which indicates the transmission channel to the receiver. Additionally, the parties of the connection must agree upon connection set-up before data transmission and connection set-down after the transmission. In mobile communications systems, for example, the base station system must also locate the mobile station before connection set-up.

Channels can be defined as logical and physical channels. The term "logical channel" refers to a channel whose use is in some way determined. For example, traffic channels are used for transmitting user information and signalling channels for transmitting control information required for connection management. Signalling channels can be further divided into connection-specific channels and shared channels. In the case of a connection-specific channel, the channel itself determines the receiver of the message. In the case of a shared channel used by several connections, the receiver's identity is indicated by adding the receiver's identifier to the message. As a result, messages are slightly longer in shared channels than in connection-specific channels even though the actual information content is the same.

Connection-specific and shared signalling channels can be further divided, when necessary, into subcategories. In a mobile communications system, for example, shared signalling channels can be divided as follows: the Broadcast Control Channel (BCCH) intended for transmitting network managing information for all mobile stations, the Paging Channel (PCH) which is used to send paging messages to specific mobile stations, and the Access Grant Channel (AGCH) which is used in call set-up.

The term "physical channel" refers to a specified section of the transmission band. In an FDMA/TDMA (FDMA=Frequency Division Multiple Access, TDMA=Time Division Multiple Access) system, for example, the physical channel consists of a specific frequency and time frame interval. Logical channels are mapped to physical channels so that a specific physical channel always provides for a specific logical channel. The information about the mapping of logical channels to physical channels must naturally be known both by the sender and the receiver, and, therefore, this information must be transmitted, during connection set-up phase, via predefined signalling channels, such as AGCH.

In known systems, there is a specific logical channel for each message that transmits control information. An example of such a system is shown in FIG. 1. The figure displays the transmission of four different types of control information in a mobile communications system from the Base Station Subsystem (BSS) to the Mobile Station (MS). The message that conveys the Power Control (PWC) command for the Mobile Station, is sent via the Slow Associated Control Channel (SACCH). Correspondingly, all messages which relate to handover are sent via the Fast Associated Control Channel (FACCH). Messages which are related to paging of Mobile Stations are sent via the Paging Channel (PCH), and messages which are related to connection set-up before the allocation of a connection-specific channel are sent via the Access Grant Channel (AGCH).

In this example, intervals 0 through 22, defined by the physical channel are in connection-specific use of the connection under study, and intervals 23 and 24 are used by signalling channels shared by several connections, and interval 25, which defines the end of the frame, is empty. The SACCH is set, in accordance with system specifications, in interval 12 of a frame which consists of 26 consecutive intervals. In the figure, interval 12 is indicated by the symbol S which also signifies the logical channel. Thus, the receiver always knows that the information received through interval 12 belongs to the SACCH, and, on the basis of that knowledge, can interpret the message correctly. Correspondingly, all messages received through interval 23 belong to the logical Paging Channel (PCH), and all messages received through interval 24 belong to the logical Access Grant Channel (AGCH), and, on the basis of this knowledge, the receiver can interpret them correctly.

Contrary to other logical channels, the mapping of the Fast Associated Control Channel (FACCH) to a physical channel has not been set by signalling or system specifications. Instead, it can use any interval T allocated to the traffic channel. In this case, the logical channel used in the interval must be indicated in the actual information sent through the interval. Known methods of separating the FACCH from the Traffic Channel are shown in FIGS. 2, 3A, and 3B.

FIG. 2 shows a burst used in the call traffic across the radio interface between a Mobile Station and a Base Station Subsystem in a GSM system. The effective part of the burst consists of the first and second half-burst, their two signalling bits ("stealing bits"), and the instruction sequence used to estimate the channel characteristics. In this burst type, the first half-burst belongs to the signalling traffic of the logical FACCH channel if the first signalling bit is 1, and otherwise to the traffic of the Traffic Channel (TCH). Correspondingly, the second half-burst belongs to the signalling traffic of the logical FACCH channel if the second signalling bit is 1, and otherwise to the traffic of the Traffic Channel (TCH). Thus, it is possible to use the traffic channel burst for signalling either partially or entirely.

Different logical channels have different characteristics. Because of its limited physical channel capacity, the Slow Associated Control Channel (SACCH) is slow, and, therefore, it can only be used to transfer relatively small and delay-tolerant information streams. Another problem for this logical channel is that the channel reserves transmission resources available to the system even when it does not have any messages to carry. In a GSM system, for example, SACCH is used for downlink control of power and timing advance (from the Base Station Subsystem to the Mobile Station), and for uplink reporting of received signal measurements made by the Mobile Station (from the Mobile Station to the Base Station Subsystem).

The Fast Associated Control Channel (FACCH) is considerably faster than the Slow Associated Control Channel SACCH, because it can use the bandwidth allocated to traffic channels. On the other hand, the bandwidth adopted by FACCH from the Traffic Channel is no longer available to the Traffic Channel, resulting in the deterioration of the Quality of Service (QoS) of the Traffic Channel. In a GSM system, for example, FACCH is used to send information, such as messages related to call set-up, authentication and handover.

The capacity of shared channels is limited and used by several Mobile Stations. In some cases, this can increase the transmission delay of messages sent via a shared channel. This is the reason why shared channels are used, in an existing GSM system, for example, only for sending messages before connection set-up between the transmitter and receiver. Such messages include paging messages and connection set-up messages.

The problem with solutions that are in accordance with the prior art is the rigidity of the signalling method described above. When large numbers of messages are transmitted via the Fast Associated Control Channel (FACCH), which uses the capacity of the Traffic Channel, the quality of the connection using the Traffic channel deteriorates. Other connection-specific channels reserve transmission capacity available to the system. Choosing the level of this capacity is a compromise between the signalling speed and the bandwidth allocated to channels. This results in slow signalling when a relatively large number of messages is generated. Because of slow signalling, the system control capacity deteriorates which, in turn, results in the non-optimal use of other resources. Correspondingly, when only a few signalling messages are sent, a separate channel allocated to signalling is a waste of system resources. Additionally, slow signalling channel allocation is typically connected to traffic channel allocation. As a result, the use of a slow signalling channel may, in some cases, cause a need to maintain the Traffic Channel even though the Traffic Channel is no longer needed for the transmission of user data.

If the shared signalling channels are to transmit messages at the rate required by the system, they must be allocated a fixed share of the transmission capacity available to the system. This capacity cannot be allocated to traffic channels. Because the transmission of messages via a shared channel is statistical in nature and varies considerably over time, some of the transmission resources allocated to the shared channel are left unused.

Thus, the problems in systems which are in accordance with the prior art include slowness of signalling, deterioration of connection quality, and non-optimal use of the transmission band.

The purpose of this invention is to remove or at least alleviate the problems caused by the above-mentioned solutions that are in accordance with the prior art. This goal can be attained by using the method and equipment described in an independent patent claim.

SUMMARY OF THE INVENTION

The idea of the present invention is to enable transmission of control information via several logical channels and to select channels used for transmission of information in a dynamic manner by using a predefined selection rule.

There are at least two logical channels that can be selected for information transmission. These logical channels include preferably at least one connection-specific signalling channel. Connection-specific signalling channels can be channels which assume some of the traffic channel capacity or signalling channels allocated independently of traffic channels. At least one of the available logical channels should preferably also be a shared channel allocated for shared signalling by several connections.

The parameters of the selection rule used for logical channel selection include the effect of the use of the logical channels on the quality of the connection using the Traffic Channel, the current usage rate of the logical channels, the number and priority of the messages to be sent, and an estimate of the number and priority of any messages to be sent in the near future.

According to one preferable embodiment, the logical signalling channel to be used is selected by a layer managing the radio resources of the transmission protocol, such as the Medium Access Control (MAC) layer.

BRIEF DESCRIPTION OF THE FIGURES

In the following, the invention is described in detail referring to the attached figures.

DETAILED DESCRIPTION OF THE INVENTION

Although it is not always possible to transfer signalling to shared channels (for instance, handover signalling due to delay requirements), it is possible in some cases. If the Mobile Station listens to shared channels anyway, it is not always optimal to use a part of the traffic channel capacity for signalling and thus deteriorate the quality of the connection using the traffic channel. Instead, it is beneficial to use any idle and otherwise wasted capacity of the shared channel for message transfer.

On the other hand, if a part of the traffic channel capacity is used for signalling, it does not in some cases cause significant or even noticeable deterioration in the Quality of Service of the connection of the Traffic Channel. In this case, for example, a signalling message which is transmitted via the Slow Associated Control Channel (SACCH) could be transmitted faster via the Fast Associated Control Channel (FACCH) which uses the traffic channel capacity. When the message is transmitted to the receiver faster, any control commands transmitted within the message can also be executed faster. Because of the faster control capability of this system, more efficient use can be made of the resources available to the system which, in turn, improves the total capacity of the system.

Figure 1:
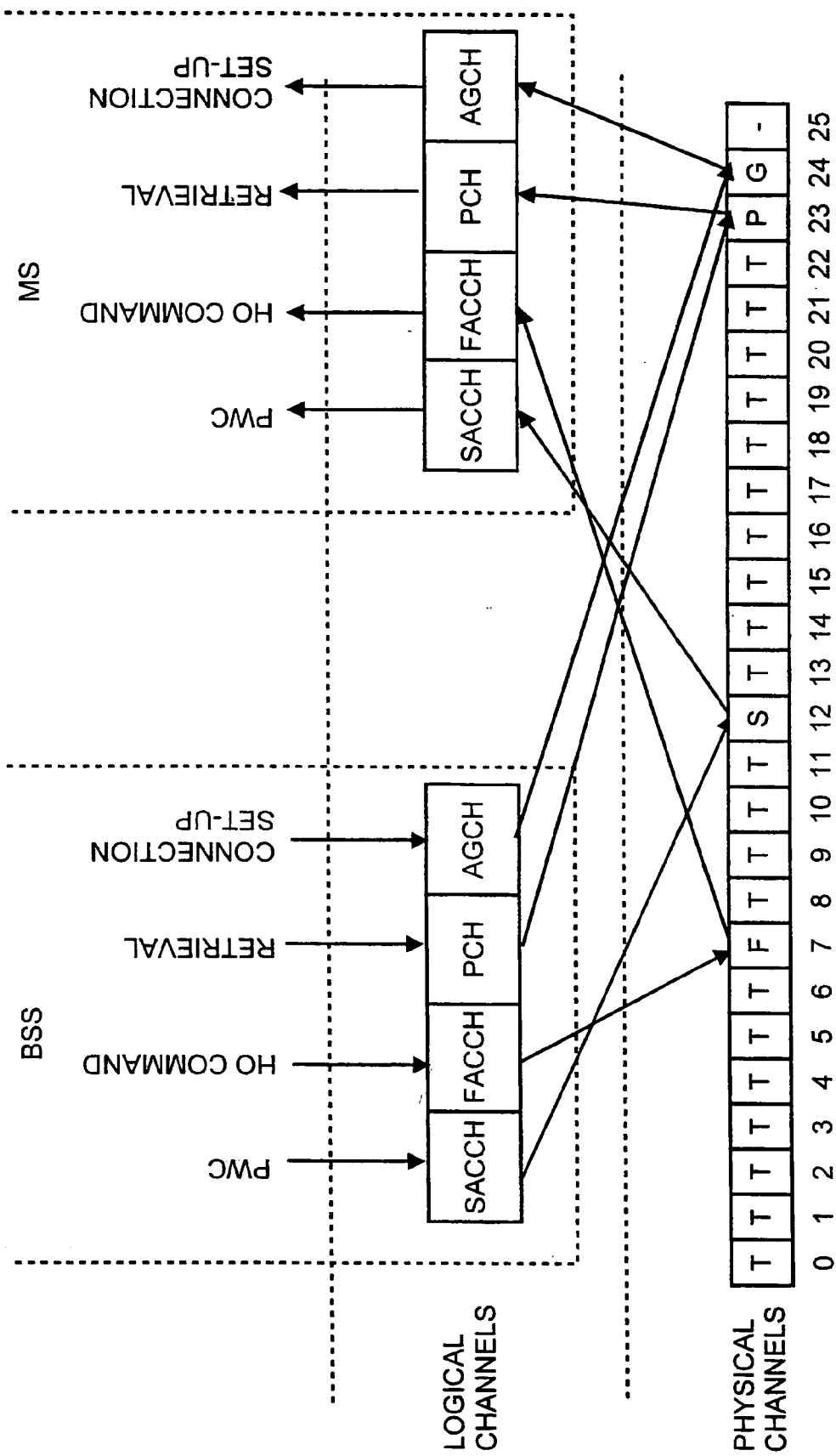
FIG. 1 illustrates a signalling method in accordance with the prior art.
Figure 2:
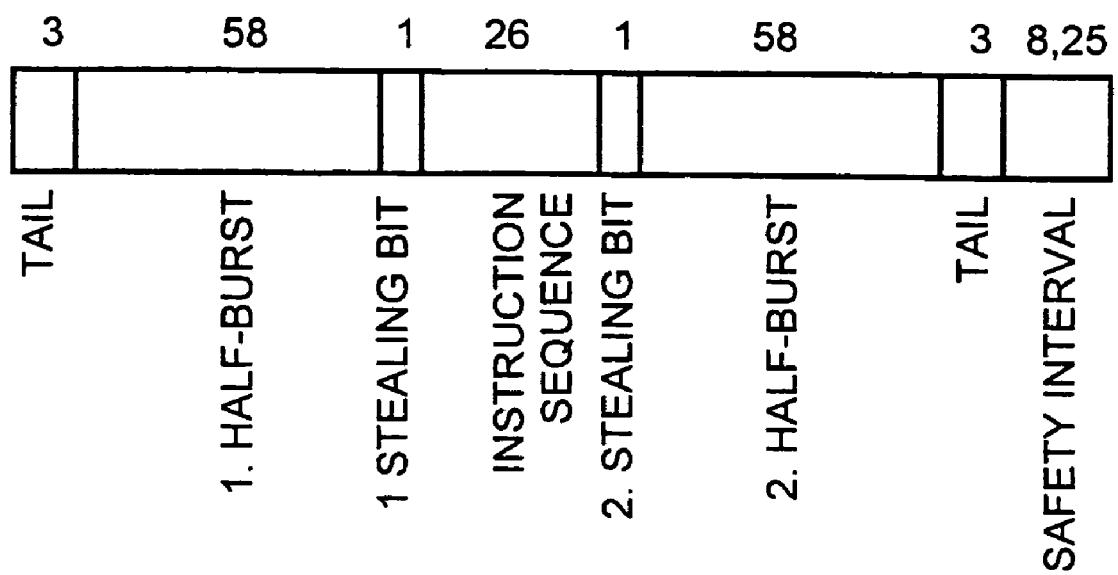
FIG. 2 illustrates a known method for separating the signalling channel and the traffic channel.
Figure 3:
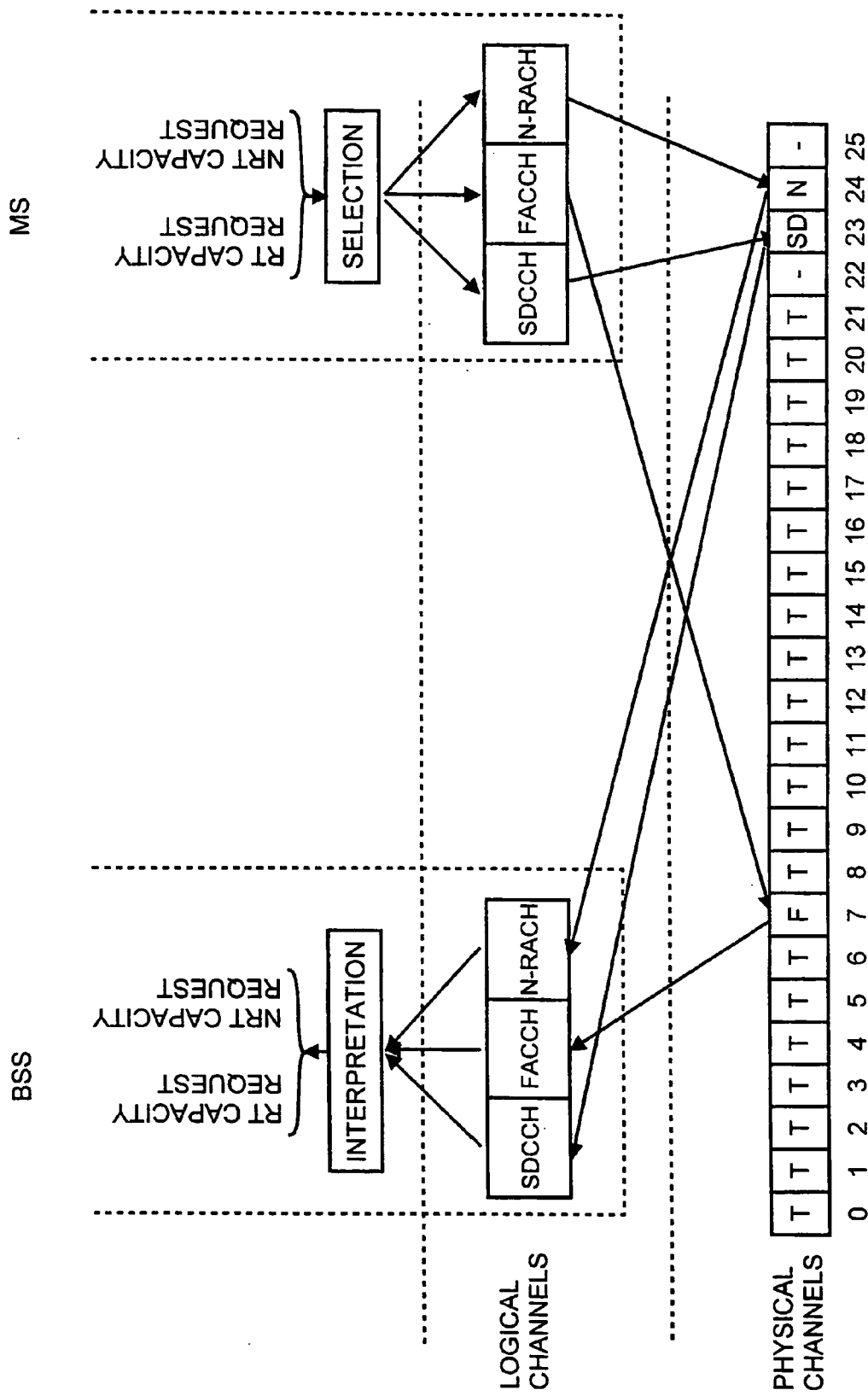
FIG. 3 illustrates an example of the signalling method according to the invention.
Figure 4:
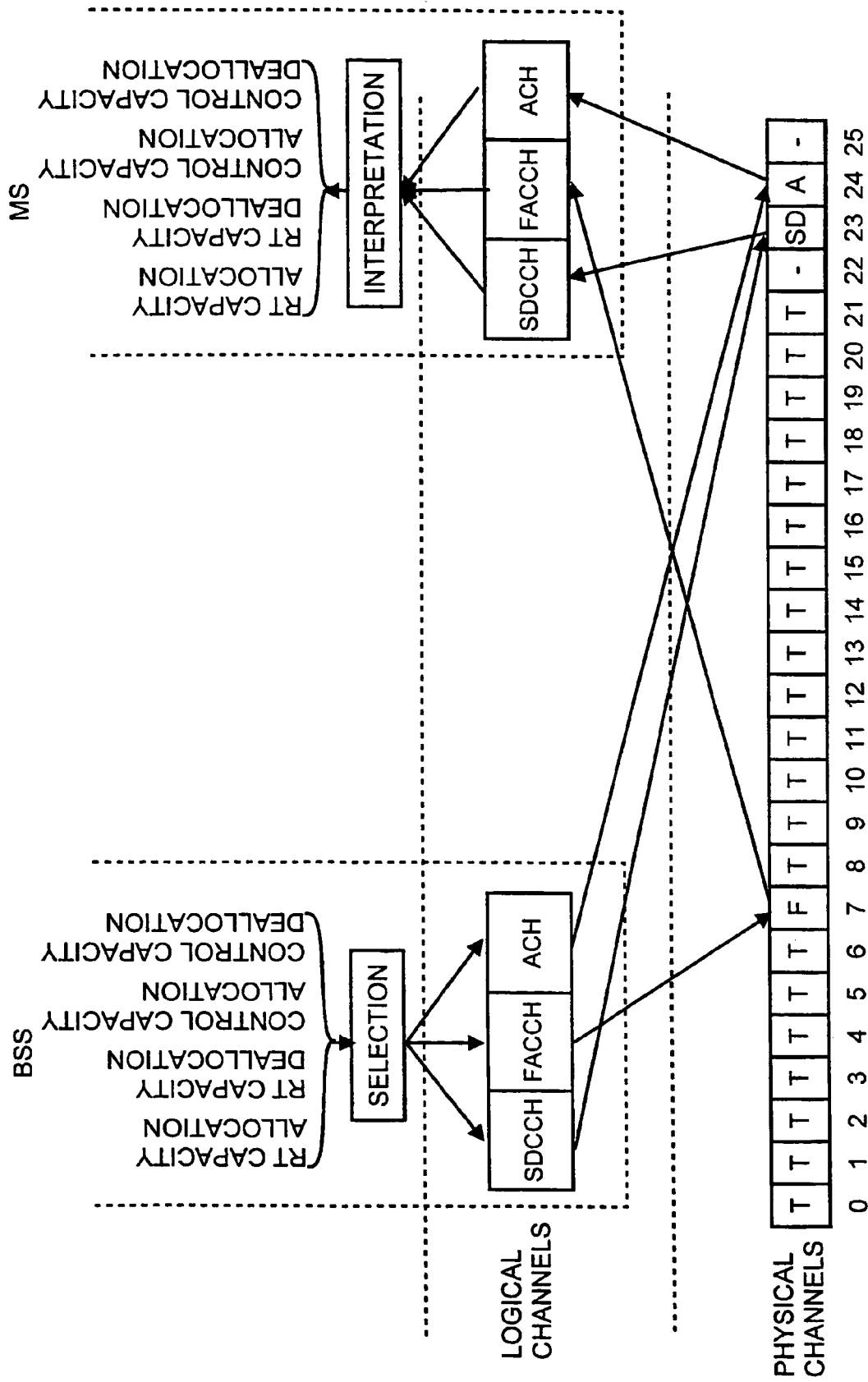
FIG. 4 illustrates another example of the signalling method according to the invention.

The signalling arrangement according to the invention is illustrated in FIGS. 3 and 4. FIG. 3 illustrates the transmission of messages from the Mobile Station (MS) to the Base Station Subsystem (BSS). The messages are related to the physical channel allocation request made by the Mobile Station. According to the invention, it is possible to transmit these messages via different logical channels. The available signalling channels are the Stand-alone Dedicated Control Channel (SDCCH), which is allocated separately from traffic channels for each connection, the Fast Associated Control Channel (FACCH), which uses the traffic channel band, and the Normal Random Access Channel (N-RACH), which is shared by several connections. Different logical channels should preferably use slightly different message formats. In the shared N-RACH channel, for instance, the message must include the connection identifier, which is not needed with connection-specific signalling channels. When sending a message at a particular point in time, the selection facilities of the Mobile Station are used to select, according to a predefined selection rule, the channel which is optimal for sending the message. This logical channel is mapped to a physical channel as shown in the figure. The message is sent across that physical channel by using the Mobile Station's transmission facilities. At the point in time shown in the figure, the intervals of the physical channels are allocated as follows: intervals 0 through 21 are allocated to traffic channels, intervals 22 and 23 can be allocated to connection-specific SDCCH channels, interval 24 is used by the multiple-access N-RACH channel, and interval 25 is empty. The Base Station Subsystem has been adapted to correctly interpret connection set-up requests from all logical SDCCH, FACCH, and N-RACH channels which are available for message transfer.

FIG. 4 illustrates the transmission of messages related to physical channel allocation from the Base Station Subsystem (BSS) to the Mobile Station (MS). In accordance with the invention, the messages can be transmitted by using different logical channels. The available signalling channels are the Stand-alone Dedicated Control Channel (SDCCH), which is allocated separately from traffic channels for each connection, the connection-specific FACCH channel, which uses the traffic channel band, and the Allocation Channel (ACH), which is shared by several connections.

When sending a message at a particular point in time, the selection facilities of the Base Station Subsystem are used to select, according to a predefined selection rule, the channel which is optimal for sending the message. The Base Station Subsystem (BSS) consists of the Base Station Controller (BSC) and the Base Transceiver Stations (BTS). The selection of the logical channel and the transmission of the messages over the selected logical channel can be carried out by using the selection and transmission facilities located either at the Base Transceiver Station (BTS) or at the Base Station Controller (BSC). At the point in time shown in the figure, the intervals of the physical channels are allocated as follows: intervals 0 through 21 are allocated to traffic channels, intervals 22 and 23 can be allocated to connection-specific SDCCH channels, interval 24 is used by the Allocation Channel (ACH), and interval 25 is empty. The Mobile Station can correctly interpret channel allocation messages from all logical SDCCH, FACCH and ACH channels which are available for message transfer.

An important observation is that it is preferable to send the control information via different logical channels in different situations. The information can be sent either by using a connection-specific signalling channel or one shared by several connections. In systems where one link (for example, the link between the Base Station Subsystem and the Mobile Station) contains several simultaneously active connections, link-specific signalling channels can be allocated as shared by all link connections,
as shared by a group of link connections, or
separately to some link connections.

In this application, the term "connection-specific signalling channel" refers, for the sake of simplicity, to all signalling channels which are allocated using some of these methods.

Connection-specific signalling channels include, for example, the FACCH and SDCCH. When using the Fast Associated Control Channel (FACCH), which "steals" some of the traffic channel band, the messages can be sent quickly and a certain speed level can be guaranteed for the connection. However, this limits the transmission band available to the traffic channel which may cause deterioration in the quality of the connection. When using the independent connection-specific SDCCH channel, which is allocated separately from the logical traffic channel, the messages can be sent quickly and in accordance with delay requirements. However, a sufficient number of physical channels must first be allocated to the SDCCH. As physical channels should not be kept allocated when they are not needed, adopting a SDCCH channel or changing the transmission bandwidth allocated to it, always requires extra signalling.

The drawback in connection-specific logical channels is their low statistical efficiency compared with shared logical channels allocated to several connections. The higher efficiency of channels shared by all system subscriber units, such as Mobile Stations or a group of subscriber units, is based on "statistical multiplexing". Statistical multiplexing can be efficiently used if the use of the channel for the messages from different connections can be controlled systematically. This can be achieved, for example, in a mobile communications system when sending Base Station Subsystem (BSS) messages to several Mobile Stations (MS).

An example is used to explain the benefits of statistical multiplexing in the following. In this example, the Base Station Subsystem sends an average of ten messages per second to ten distinct subscriber units. The sending of one message always requires one interval. There is statistical deviation in the number of messages sent: in 95% of the cases, the number of messages to be sent to a single subscriber unit is under 15. Longer delays are not allowed for messages, and messages must be transmitted in 95% of the cases to the Base Station Subsystem with a delay of under one second.

For message transmission, it is possible to allocate separate transmission capacity to each connection between the Base Station Subsystem and the subscriber unit. To satisfy the requirements set for the transmission speed of messages, each user must be allocated 15 intervals per second. Thus, a total of 150 intervals per second must be allocated for message transmission. For most of the time, considerably less than 15 messages per second are sent to a single subscriber unit which means that a significant portion of the capacity allocated for message transfer is underused.

It is also possible to allocate a shared channel for message transmission which is used to transfer all messages sent to different subscriber units. In this case, a message receiver identifier must be added to each message. For example, a 3-bit identifier can be used to separate the messages of 10 different receivers. For the sake of simplicity, let us also assume that a message with an identifier fits in one interval. If the messages are transmitted via a shared channel, the independence of the messages sent to different subscriber units is an advantage. It is highly improbable that 15 or more messages would be sent to all subscriber units within a certain second. The average total number of messages sent to ten subscriber units (with an average of ten messages per subscriber unit and less than 15 in 95% of the cases) is less than 114 messages. Therefore, an allocation of 114 intervals per second is sufficient for a shared channel. Compared with the use of connection-specific channels, the resulting saving is 36 intervals, or 24%, in transmission capacity.

As mentioned above, the efficient use of statistical multiplexing requires the co-ordination of message transfer. For example, messages sent by different Mobile Stations to the same Base Station via a shared channel cannot be coordinated without an Aloha-type random access method. If two or more mobile stations send their messages to the Base Station Subsystem simultaneously, a "message collision" occurs, and, typically, the Base Station Subsystem is unable to correctly interpret any of the messages sent to it. This limits the penetration of shared uplink channels to a degree where, for example, the penetration level of a channel allocated to ten users is a maximum of 39 percent of the channel capacity.

The selection of the logical channel to be used can be affected, for example, by the number of messages to be sent. If a large number of signalling messages to be sent has accumulated in the buffer, the transfer of messages via the FACCH would significantly deteriorate the quality of the traffic channel. Correspondingly, the transfer of messages via the shared channel would take a significant portion of the shared channel bandwidth, which would cause other connections to suffer and decrease overall efficiency. In this case, it is best to use a separate connection-specific SDCCH channel for message transfer. Any allocation of the SDCCH required does not significantly add to the signalling, and the usage rate of the allocated channel capacity will be sufficiently high.

If there are only a few messages to be sent, it is not worthwhile to allocate a connection-specific SDCCH channel, because allocation itself causes too large a relative signalling need. Correspondingly, the sending of these messages does not significantly load the shared channel. In this case, the FACCH, which also uses the traffic channel capacity, is a better choice than the SDCCH, as there is no need to use a significant portion of the traffic channel bandwidth.

In addition to the number of messages already in the transmission buffer, the selection of a logical channel can also be based on the estimated number of messages to be sent in the near future. The number of messages to be sent in the near future can be estimated to be large at the start-up of call set-up, authentication or handover, for example. It may be useful to allocate a separate connection-specific SDCCH channel distinct from the traffic channel for such expected signalling needs. The allocation of the SDCCH is also useful for regular longer-term signalling needs. An example of such a signalling need is the feedback signalling of downlink power control in which a message is sent regularly, for example, every 500 milliseconds.

The third factor which affects the selection of a logical channel is the priority and delay requirements of the messages waiting in the transmission queue. When transferring delay-tolerant Non-Real Time (NRT) information, such as a computer program to be executed, the signalling can be a little slower. On the other hand, when the signalling is related to Real Time (RT) traffic with strict transmission delay requirements, it is important that, for example, the channel is allocated as fast as possible for the connection in order to satisfy the delay requirements set for the traffic channel. Therefore, the signalling delay requirements set to RT traffic must be significantly higher than those set to NRT traffic.

In addition to connection type, the contents of the message itself naturally have an effect on message priority and delay requirements. Some messages transfer information which must be delivered to the receiver very quickly, for example, to prevent the call from breaking off. An example of such a situation is handover caused by a sudden drop in signal level. On the other hand, a handover carried out only to get a slightly better channel is not as urgent because, if it is delayed, the call is not broken off.

Of the logical channels described in the above example, the shortest delay is typically guaranteed by the use of the FACCH channel which uses the traffic channel bandwidth. Messages can be transferred quickly via the SDCCH only if a sufficient capacity has already been allocated to the SDCCH. If the allocated capacity of the SDCCH must be changed to send messages, the signalling required by the allocation change causes additional delay. If messages are sent via a shared channel, the delay is heavily affected by the current usage rate of the shared channel.

The fourth factor which affects the selection of the logical channel is the effect of the use of the logical channel in question on the Quality of Service (QoS). For example, if the traffic channel of a video connection which requires a low bit/error ratio is taken into signalling use, the Quality of Service may deteriorate too much. On the other hand, if a portion of the same size is taken into signalling use from the traffic channel of a voice connection which allows a higher bit/error ratio, the quality of the voice connection may not deteriorate noticeably. The least problems from the taking of the traffic channel into signalling use are caused to delay-tolerant NRT-type connections for which the lower traffic channel capacity causes only a slight additional delay.

The fifth factor which affects the selection of the logical channel is the usage ratio of the channels allocated to signalling. If, for example, the SDCCH channel which has already been allocated for use by the connection and which is external to the traffic channel, contains unused capacity which has not yet been released, it is naturally preferable to use it for message transfer. Correspondingly, the usage rate of the shared channels affects the message delay. If the usage rate is low, it is worthwhile to send the message via the shared channel. This enables the use of some of the currently unused capacity allocated to the shared channel, which improves the channel's usage rate. On the other hand, it is not preferable to cause additional load to a shared signalling channel which is already heavily loaded. In mobile communications systems, the information about the shared channel load level is not available to Mobile Stations, but only to the Base Station Subsystem. Because of this, the load information can only be used when selecting the logical channel for messages sent from the Base Station Subsystem to the Mobile Station.

Figure 5:
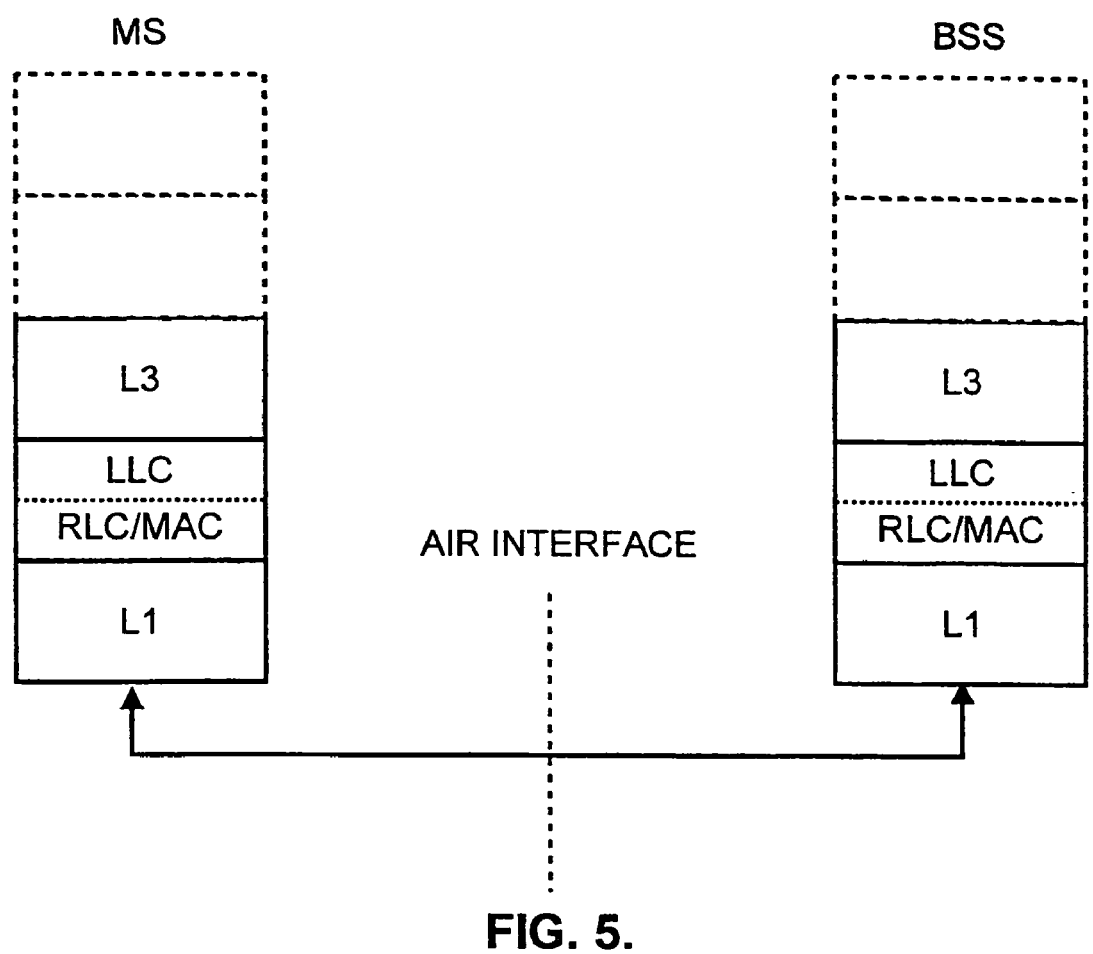
FIG. 5 illustrates the protocol stack which controls the use of the transmission band.

Let us study, in the following, a preferable protocol arrangement which implements functionality according to the invention. FIG. 5 shows a protocol stack which controls the radio interface traffic of a mobile communications system. The figure shows the physical layer L1, the link layer L2 which consists of the sublayers RLC/MAC (RLC=Radio Link Control, MAC=Medium Access Control) and LLC (Logical Link Control), and the network layer L3. There are other layers above the network layer but they are not essential to this study.

The physical layer codes, multiplexes and modulates the signal for radio transmission. Correspondingly, the layer decodes the modulation, multiplexing and channel coding of the signal during radio reception.

The RLC/MAC sublayer located above the physical layer handles the management and allocation of radio resources and related signalling, and the mapping of logical channels to physical channels. The layer can be divided into the MAC section which is common to all connections, and to the connection-specific RLC section. The management of radio resources takes place in the Base Station System located within the fixed network.

Radio resources are allocated to various connections in a slightly different manner because of the differing nature of their transmission needs. For RT connections which place strict requirements on delay, MAC allocates a circuit-switched channel which can be changed dynamically. The allocation is in effect until it is released by the next MAC message.

For NRT connections which have better delay tolerance, MAC allocates a packet-switched channel. On the packet-switched channel, MAC gives the connection permission to send a certain amount of data at a time. The channel can be allocated either for sending a specific packet group only or for a longer term connection for sending several sequential packet groups.

Within the RLC/MAC layer, the RLC unit, which is defined for each connection separately, handles the maintenance of the Quality of Service (QoS) which was negotiated for the connection. To keep the quality on the negotiated level, RLC selects the correct transmission format for the connection, which includes the selection of error correction, multiplexing depth and modulation method, and retransmission of faulty frames.

LLC establishes a logical connection for the radio transmission which uses the services offered by the RLC/MAC layer located beneath the LLC. LLC uses the information received from layers located above it to create LLC frames suitable for radio transmission by the RLC/MAC layer and, correspondingly, assembles the radio information contained in consecutive LLC frames received from the RLC/MAC layer for transmission to layers located above the LLC.

It is best to select the logical channel to be used for message transmission in the protocol layer, where most of the above-mentioned information which affects channel selection can be found. Additionally, the lower the protocol implementation level the more effective the functionality.

The information about the logical content of the physical channels is not available to the physical layer, so the functionality cannot be placed there. The best place for implementing the functionality according to the invention is the MAC/RLC layer. Regarding the above-mentioned information which improves the selection of the logical channel, the RLC/MAC layer and the RLC unit within it hold the information concerning the number of buffered messages. Additionally, the RLC unit can estimate the delay requirements and priority and expected number of the so-called MAC messages created by the RLC/MAC layer. The Quality of Service monitoring is also implemented in the RLC unit contained within the layer. Furthermore, the layer knows the usage rate of allocated channels since it is responsible for physical channel allocation. The only information that is directly missing in the MAC layer is the estimate of the number and priority of the expected number of upper layer messages. Even this information can be directed to it, if necessary, by using the signalling between protocol layers.

Even though the invention is described above as implemented within the context of signalling which occurs over the radio interface of a mobile communications system, it is clear that the invention's scope of protection is not limited to this context. This invention can be used in all systems where several logical channels can be mapped in various ways to physical channels.

In addition to pure signalling data, this method can also be used to transfer small amounts of user information. For larger amounts of user information, it is naturally best to allocate a traffic channel in the normal manner. In some cases, however, it is best to transmit small user data packages, which may be separate from other link connections, such as DTMF control signals, by using a logical signalling channel (such as an already allocated connection-specific signalling channel or a signalling channel which is shared by several connections) which is selected according to this invention. A message type which separates the message from the signalling traffic should, naturally, be used for such user information.

What is claimed is:

1. A method of transmitting information from the sender to the receiver in a communications system which consists of several subscriber units and at least one network element servicing the subscriber units and in which links are formed between units for information transfer, in which the transmission resources which consist of physical channels are divided between logical channels which are separated according to the type of information to be transferred on the channel, such as signaling channels intended for transmission of signaling information needed to maintain connection and traffic channels which are required for transmission of information from one user to another, wherein the logical channel used for transmission of a piece of information is selected dynamically from a group of logical channels with different characteristics which are available for transmission of the piece of information according to a predefined transmission rule, and the piece of information is sent to the receiver via the selected logical channel.

2. A method according to claim 1, wherein the information is control information related to controlling the connection.

3. A method according to claim 1, wherein the information to be sent is a signaling message related to controlling radio resources.

4. A method according to claim 3, wherein the logical channels available for selection include at least one shared channel allocated for common signaling between all subscriber units and the network element which provides services for them.

5. A method according to claim 4, wherein the shared channel is allocated jointly to all subscriber units of the system.

6. A method according to claim 4, wherein the shared channel is allocated jointly to a group of subscriber units.

7. A method according to claim 1, wherein the information to be sent is utility data transmitted between the users.

8. A method according to claim 1, wherein the logical channels which can be selected include at least one link-specific signaling channel which is common to a group of link connections.

9. A method according to claim 8, wherein the link-specific signaling channels include a signaling channel which uses the capacity allocated to the traffic channel.

10. A method according to claim 8, wherein the link-specific signaling channels include a signaling channel which is allocated to the connection separately from the allocation of traffic channels.

11. A method according to claim 1, wherein the logical channels which are available for selection include at least one signaling channel which is connection-specific to one of the link connections.

12. A method according to claim 11, wherein the connection-specific signaling channels include a signaling channel which uses the capacity allocated to the traffic channel.

13. A method according to claim 11, wherein the connection-specific signaling channels include a signaling channel which is allocated to the connection separately from the allocation of traffic channels.

14. A method according to claim 1, wherein the parameters of the selected rule used in logical channel selection include the quantity of buffered information to be sent.

15. A method according to claim 1, wherein the parameters of the selection rule used in the logical channel selection include an estimate of the quantity of information which will arrive for sending in the future.

16. A method according to claim 1, wherein the parameters of the selection rule used in the logical channel selection include the requirements to the transmission delay set by the information to be transmitted.

17. A method according to claim 1, wherein the parameters of the selection rule used in the logical channel selection include the priority of the information to be sent.

18. A method according to claim 1, wherein the parameters of the selection rule used in the logical channel selection include the change in the quality of service of the connection caused by the use of at least one logical channel available for the transmission of information.

19. A method according to claim 1, wherein the parameters of the selection rule used in the logical channel selection include the load level of at least one logical channel which is available for selection for the transmission of information.

20. A method according to claim 1, wherein the selection of the logical channel to be used is carried out by the unit which manages radio resources.

21. A method according to claim 1, wherein the information to be sent is transmitted over different logical channels in different messages.

22. A base station controller for a mobile communications system which consists of at least one base station controller, base stations, and several mobile stations, in which it is possible to establish connections between mobile stations and base stations, and in which system the transmission resources which consist of physical channels are divided between logical channels separated according to the type of information to be transferred on the channel, the base station controller comprising:

selection facilities for dynamic selection of the logical channel to be used for sending a piece of information from a group of logical channels with different characteristics which are available for transmission of the piece of information according to a predefined selection rule, and transmission facilities for sending the piece of information to a mobile station via the selected logical channel.

23. A base station for a mobile communications system which consists of at least one base station controller, base stations, and several mobile stations, in which it is possible to establish connections between mobile stations and base stations, and in which system the transmission resources which consist of physical channels are divided between logical channels separated according to the type of information to be transferred on the channel, the base station comprising:

selection facilities for the dynamic selection of the logical channel to be used for sending a piece of information from a group of logical channels with different characteristics which are available for the transmission of the piece of information according to a predefined selection rule, and transmission facilities for sending the piece of information to a mobile station via the selected logical channel.

24. A mobile station for a mobile communications system which consists of at least one base station controller, base stations, and several mobile stations, in which it is possible to establish connections between mobile stations and base stations, and in which system the transmission resources which consist of physical channels are divided between logical channels separated according to the type of information to be transferred on the channel, the mobile station comprising:

selection facilities for the dynamic selection of the logical channel to be used for sending a piece of information from a group of logical channels with different characteristics which are available for the transmission of the piece of information according to a predefined selection rule, and transmission facilities for sending the piece of information to a base station via the selected logical channel.

* * * * *